United States Patent
Jeon et al.

(10) Patent No.: US 12,250,589 B2
(45) Date of Patent: Mar. 11, 2025

(54) APPARATUS AND METHOD FOR CHANNEL SOUNDING

(71) Applicant: SAMSUNG ELECTRONICS CO., LTD., Suwon-si (KR)

(72) Inventors: Eunsung Jeon, Seoul (KR); Myeongjin Kim, Seongnam-si (KR); Chulho Chung, Yongin-si (KR); Jonghun Han, Gwacheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 17/827,262

(22) Filed: May 27, 2022

(65) Prior Publication Data

US 2023/0007532 A1     Jan. 5, 2023

(30) Foreign Application Priority Data

Jul. 1, 2021   (KR) .................. 10-2021-0086708

(51) Int. Cl.
    *H04W 28/06*      (2009.01)
    *H04W 84/12*      (2009.01)

(52) U.S. Cl.
    CPC ............ *H04W 28/06* (2013.01); *H04W 84/12* (2013.01)

(58) Field of Classification Search
    CPC . H04W 28/06; H04W 84/12; H04W 72/0453; H04L 5/0048; H04L 5/0053; H04L 69/26; H04L 69/322; H04L 27/2613; H04L 1/0083
    See application file for complete search history.

(56) References Cited

U.S. PATENT DOCUMENTS

| | | | |
|---|---|---|---|
| 2019/0116513 A1* | 4/2019 | Verma | H04W 74/002 |
| 2020/0076552 A1 | 3/2020 | Cherian et al. | |
| 2020/0136884 A1* | 4/2020 | Park | H04L 27/2602 |
| 2020/0177425 A1* | 6/2020 | Chen | H04L 27/2602 |
| 2020/0344007 A1 | 10/2020 | Chen et al. | |
| 2021/0044389 A1* | 2/2021 | Kim | H04L 5/0055 |
| 2021/0045151 A1* | 2/2021 | Chen | H04L 69/22 |

(Continued)

FOREIGN PATENT DOCUMENTS

| | | |
|---|---|---|
| JP | 2020-141308 A | 9/2020 |
| KR | 10-2021-0021394 A | 2/2021 |

OTHER PUBLICATIONS

"Current Status and Directions of IEEE 802.11be, the Future Wi-Fi 7"; Khorov et al.; IEEE Access ( vol. 8); May 2020 (Year: 2020).*

(Continued)

*Primary Examiner* — Benjamin H Elliott, IV
(74) *Attorney, Agent, or Firm* — Sughrue Mion, PLLC

(57) ABSTRACT

A method includes generating a first aggregated physical layer protocol data unit (PPDU) including a first null data packet (NDP) based on an extremely high throughput (EHT) protocol standard and a second NDP based on an EHT+ protocol standard, which is a next generation of the EHT protocol standard, and transmitting the first aggregated PPDU to a second apparatus in a wireless local area network (WLAN) system. Each of the first NDP and the second NDP has a same duration, and the first NDP is transmitted in a first band and the second NDP is transmitted in a second band that is different from the first band.

20 Claims, 21 Drawing Sheets

(56) References Cited

U.S. PATENT DOCUMENTS

| | | | | |
|---|---|---|---|---|
| 2021/0126755 | A1* | 4/2021 | Gan | H04L 5/0048 |
| 2021/0409078 | A1* | 12/2021 | Jeon | H04L 69/08 |
| 2022/0078792 | A1* | 3/2022 | Jeon | H04W 72/0453 |
| 2022/0232424 | A1* | 7/2022 | Chun | H04W 28/20 |
| 2022/0360397 | A1* | 11/2022 | Noh | H04L 5/0091 |
| 2022/0416971 | A1* | 12/2022 | Noh | H04W 48/10 |
| 2023/0007532 | A1* | 1/2023 | Jeon | H04L 5/0053 |
| 2023/0141486 | A1* | 5/2023 | Huang | H04L 5/0051 370/252 |
| 2023/0198825 | A1* | 6/2023 | Park | H04L 5/001 370/336 |
| 2024/0022934 | A1* | 1/2024 | Lim | H04W 24/08 |
| 2024/0023017 | A1* | 1/2024 | Park | H04L 27/2602 |
| 2024/0031059 | A1* | 1/2024 | Park | H04L 5/0092 |
| 2024/0040549 | A1* | 2/2024 | Lim | H04L 5/0007 |

OTHER PUBLICATIONS

"IEEE 802.11be: Throughput and Reliability Enhancements for Next Generation WI-FI Networks"; Hoefel; 2020 IEEE 31st Annual International Symposium on Personal, Indoor and Mobile Radio Communications: Track 2: Networking and MAC; Oct. 2020 (Year: 2020).*

"IEEE 802.11be Wi-Fi 7: New Challenges and Opportunities"; Deng et al.; IEEE Communications Surveys & Tutorials, vol. 22, No. 4, Fourth Quarter 2020; Jul. 2020 (Year: 2020).*

Eunsung Jeon (Samsung), "NDP Design for EHT", IEEE Draft, Sep. 15, 2020, XP068173233, (12 total pages).

Rui Cao (NXP), "Aggregated PPDU for Large BW", IEE Draft, 11-20-0693-01-00BE-Aggregated-PPDU-for-Large-BW, vol. 802. 11, No. 1, May 2020, XP068167945, (7 pages total).

Chenchen Liu et al., (Huawei), "EHT NDPA Frame Design Discussion", IEEE 802.11-20/1015r1, Jul. 2020, XP068170496, (22 pages total).

Jonghun Han et al., (Samsung), "Trigger Frame for Frequency-domain A-PPDU Support", doc: IEEE 802.11-20/0831r2, Mar. 2020, XP068173807, (19 pages total).

Jeon Eunsung et al., (Samsung), "Partial Bandwidth Feedback for Multi-RU Date", doc: IEEE 802.11-20/0950r3, Jul. 2020, XP055972565, (21 pages total).

Communication dated Oct. 28, 2022 issued by the European Patent Office in counterpart European Patent Application No. 22172023.8.

* cited by examiner

FIG. 4C

| B0 | B1 | Description |
|----|----|-------------|
| 0  | 0  | VHT NDPA |
| 0  | 1  | HE NDPA |
| 1  | 0  | Ranging NDPA |
| 1  | 1  | EHT NDPA, EHT+ NDPA |

FIG. 5A

EHT NDP

| L-STF | L-LTF | L-SIG | RL-SIG | U-SIG | EHT-SIG | EHT-STF | EHT-LTF | PE |
|---|---|---|---|---|---|---|---|---|
| 8μs | 8μs | 4μs | 4μs | 8μs | 4μs | 4μs | Variable duration | 4 or 8μs |

EHT+ NDP

| L-STF | L-LTF | L-SIG | RL-SIG | U-SIG | EHT+-SIG | EHT+-STF | EHT+-LTF | PE |
|---|---|---|---|---|---|---|---|---|
| 8μs | 8μs | 4μs | 4μs | 8μs | 4μs | 4μs | Variable duration | 4 or 8μs |

| Field | Part | Subfield | Bits |
|---|---|---|---|
| U-SIG | U-SIG-1 | PHY Version Identifier | 3 |
| | | BW | 3 |
| | | UL/DL | 1 |
| | | BSS Color | 6 |
| | | TXOP | 7 |
| | | Disregard | 5 |
| | | Validate | 1 |
| | U-SIG-2 | PPDU Type And Compression Mode | 2 |
| | | Validate | 1 |
| | | Punctured Channel Info | 5 |
| | | Validate | 1 |
| | | EHT-SIG MCS | 2 |
| | | Number of EHT-SIG Symbols | 5 |
| | | CRC | 4 |
| | | Tail | 6 |

FIG. 7

| Field | Category | Subfield | Bits |
|---|---|---|---|
| EHT-SIG | Common Field | Spatial Reuse | 4 |
| | | GI+LTF Size | 2 |
| | | Number of EHT-LTF Symbols | 3 |
| | | NSS | 4 |
| | | Beamformed | 1 |
| | | Disregard | 4 |
| | | CRC | 4 |
| | | Tail | 6 |

FIG. 9A

| Common Info Field | EHT Special STA Info | EHT+ Special STA Info | EHT STA Info 1' | ... | EHT STA Info n' | EHT+ STA Info 1' | ... | EHT+ STA, Info n' |

FIG. 9B

| Common Info Field | EHT Special STA Info | EHT STA Info 1' | ... | EHT STA Info n' | EHT+ Special STA Info | EHT+ STA Info 1' | ... | EHT+ STA Info n' |

| Common Info Field | EHT+ Special STA Info | EHT STA Info 1' | ... | EHT STA Info n' | EHT+ STA Info 1' | ... | EHT+ STA Info n' |

| Common Info Field | EHT STA Info 1 | ... | EHT STA Info n | EHT+ Special STA Info | EHT+ STA Info 1 | ... | EHT+ STA Info n |

APPARATUS AND METHOD FOR CHANNEL SOUNDING

CROSS-REFERENCE TO RELATED APPLICATION

This application is based on and claims priority under 35 U.S.C. § 119 to Korean Patent Application No. 10-2021-0086708, filed on Jul. 1, 2021, in the Korean Intellectual Property Office, the disclosure of which is incorporated by reference herein in its entirety.

BACKGROUND

The present disclosure relates to wireless communication, and more particularly, to an apparatus and method for channel sounding based on an aggregated physical layer protocol data unit (PPDU).

As an example of wireless communication, a wireless local area network (WLAN) is technology for connecting two or more apparatuses to each other using a wireless signal transmission method, and WLAN technology may be based on the institute of electrical and electronics engineers (IEEE) 802.11 standard. The 802.11 standard has evolved into 802.11b, 802.11a, 802.11g, 802.11n, 802.11ac, and 802.11ax standards, and may support a transmission rate of up to 1 Gbyte/s based on orthogonal frequency-division multiplexing (OFDM) technology.

In the 802.11ac standard, data may be simultaneously transmitted to multiple users through a multi-user multi-input multi-output (MU-MIMO) technique. The next evolution after 801.11ac is 802.11be and will be called extremely high throughput (EHT), and the next-generation protocol standard after EHT will be called EHT+. The EHT+ standard intends to implement 6 GHz unlicensed frequency band support, bandwidth utilization of up to 320 MHz per channel, introduction of hybrid automatic repeat and request (HARQ), and support for up to 16×16 MIMO. Through these features of EHT+, the next-generation WLAN system is expected to effectively support low latency and high-speed transmission like new radio (NR), a 5G technology.

SUMMARY

It is an aspect to provide an apparatus and method for efficient channel sounding in a wireless communication system.

According to an aspect of one or more example embodiments, there is provided a method comprising generating a first aggregated physical layer protocol data unit (PPDU) including a first null data packet (NDP) based on an extremely high throughput (EHT) protocol standard and a second NDP based on an EHT+ protocol standard, which is a next generation of the EHT protocol standard; and transmitting the first aggregated PPDU to at least one second apparatus in a wireless local area network (WLAN) system, wherein each of the first NDP and the second NDP has a same duration, and the first NDP is transmitted in a first band and the second NDP is transmitted in a second band that is different from the first band.

According to another aspect of one or more example embodiments, there is provided a first apparatus comprising a transceiver; and processing circuitry configured to generate a first aggregated physical layer protocol data unit (PPDU) including a first null data packet (NDP) based on the extremely high throughput (EHT) protocol standard and a second NDP based on an EHT+ protocol standard, which is a next generation of the EHT protocol standard, and configured to transmit the first aggregated PPDU to at least one second apparatus in a wireless local area network (WLAN system) via the transceiver, wherein each of the first NDP and the second NDP has a same duration, and the first NDP is transmitted in a first band and the second NDP is transmitted in a second band that is different from the first band.

According to yet another aspect of one or more example embodiments, there is provided a second apparatus comprising a transceiver; and processing circuitry configured to receive a first aggregated physical layer protocol data unit (PPDU) from a first apparatus in a wireless local area network (WLAN) system through the transceiver, and to estimate a channel with the first apparatus based on a second null data packet (NDP), wherein the first aggregated PPDU includes a first NDP based on the extremely high throughput (EHT) protocol standard and the second NDP based on an EHT+ protocol standard that is a next generation of the EHT protocol standard, wherein each of the first NDP and the second NDP has a same duration, and the first NDP is transmitted in a first band and the second NDP is transmitted in a second band that is different from the first band.

BRIEF DESCRIPTION OF THE DRAWINGS

Various example embodiments will be more clearly understood from the following detailed description taken in conjunction with the accompanying drawings in which:

FIG. 4C is a diagram illustrating a sounding dialog token field included in an NDP announcement frame, according to an example embodiment;

FIG. 5A is a diagram showing a structure of an extremely high throughput (EHT) NDP and a structure of an EHT+ NDP according to an example embodiment.

FIG. 6 is a diagram illustrating an example of a universal signal (U-SIG) field according to an example embodiment;

FIG. 7 is a diagram illustrating an example of an extremely high throughput-signal (EHT-SIG) field according to an example embodiment;

FIGS. 9A to 10B are diagrams illustrating configuration examples of an EHT/EHT+ trigger frame of the timing diagram of FIG. 8 according to various example embodiments;

DETAILED DESCRIPTION

Figure 1:
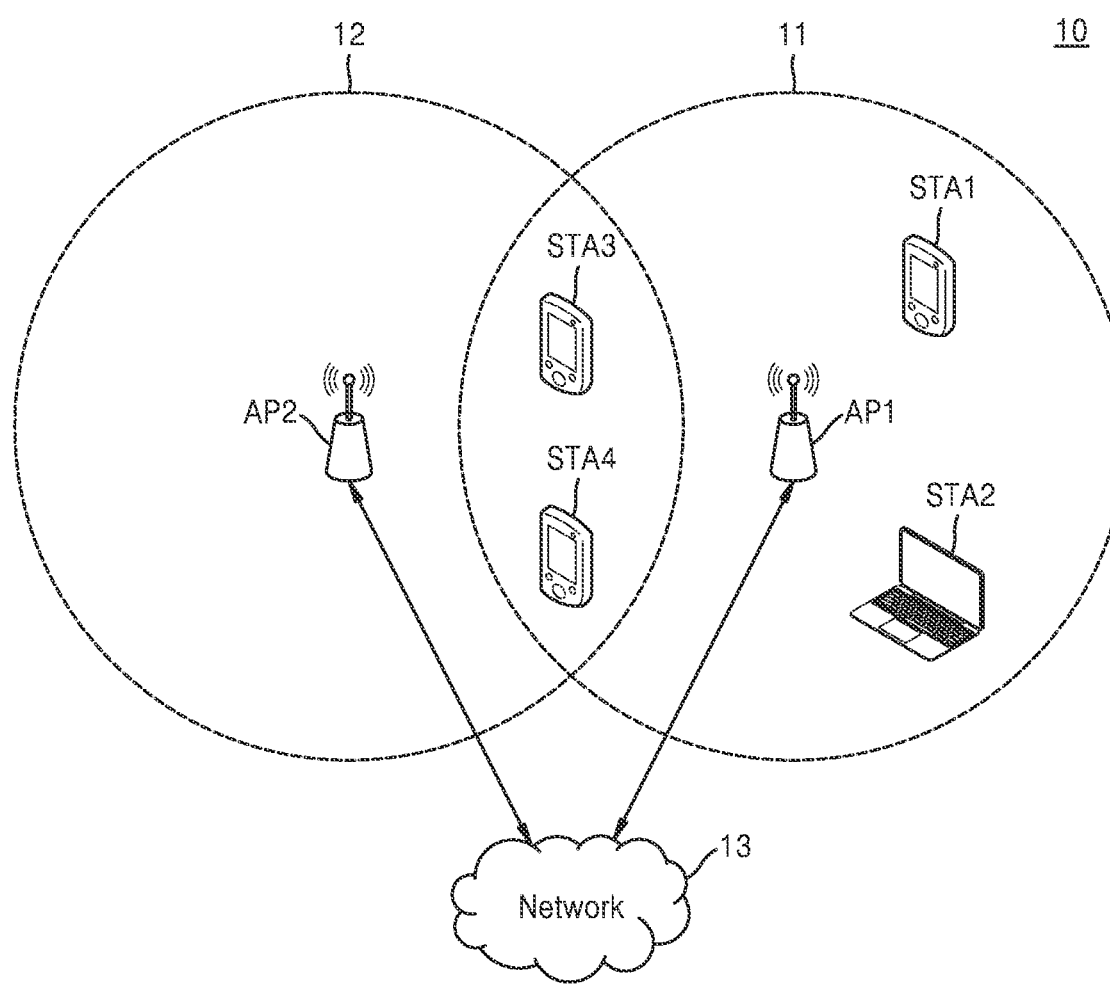
FIG. 1 is a diagram illustrating a wireless communication system according to an example embodiment.

Advantages and features of the inventive concept, and methods of achieving them, will become apparent with reference to the embodiments described below in detail in conjunction with the accompanying drawings. However, the inventive concept is not limited to the embodiments shown below, but will be implemented in various different forms, and they may be used interchangeably with each other, and only the present embodiments are intended to complete the description of the inventive concept. In addition, the inventive concept is provided to completely inform those of ordinary skill in the art to which the inventive concept belongs, the scope of the disclosure, and the scope of the inventive concept is only defined by the scope of the claims. In addition, specific configurations described only in each embodiment of the inventive concept may be used in other embodiments. Throughout the specification, the same reference numerals refer to the same elements.

The terminology used herein is for the purpose of describing the embodiments and is not intended to limit the scope of the inventive concept. In this specification, the singular also includes the plural, unless specifically stated otherwise in the phrase. As used herein, "comprises" and/or "comprising" may mean that a recited element, step, operation, and/or apparatus does not exclude the presence or addition of one or more other elements, steps, operations, and/or apparatuses.

Unless otherwise defined, all terms (including technical and scientific terms) used herein may be used with the meaning commonly understood by those of ordinary skill in the art to which this disclosure belongs. In addition, terms defined in a commonly used dictionary are not to be interpreted ideally or excessively unless clearly defined in particular.

In addition, in describing the example embodiments, although OFDM or OFDMA-based wireless communication systems, in particular, IEEE 802.11 standards, will be mainly targeted, the technical concept is applicable to other communication systems having a similar technical background and channel form with slight modifications within the scope not significantly departing from the scope of the present disclosure, which is possible at the discretion of a person skilled in the art of the present disclosure, wherein the communication systems having a similar technical background and channel form include, for example, a cellular communication system such as long term evolution (LTE), LTE-advanced (LTE-A), new radio (NR), wireless broadband (WiBro), global system for mobile communication (GSM) or a short-range communication system such as Bluetooth or near field communication (NFC).

In addition, before proceeding with the detailed description that follows, definitions of certain words and phrases used throughout this patent document will be set forth. The terms "comprise" and "include" and derivatives of the terms "comprise" and "include" denote inclusive without limitation. The word "connects" and derivatives of the word "connect" refer to any direct or indirect communication between two or more components, whether or not the two or more components are in physical contact with each other. The terms "transmit", "receive", and "communicate", and derivatives of the terms "transmit", "receive", and "communicate" include both direct and indirect communication. The word "or" is an inclusive word meaning 'and/or'. The word "related to" and derivatives of "related to" denote to include, to be included in, to interconnect with, to imply, to be implied in, to connect with, to combine with, to communicate with, to cooperate with, to intervene, to place alongside, to approximate, to be bound by, to have, to have the characteristics of, to relate to, and the like. The term "controller" denotes any apparatus, system, or part thereof that controls at least one operation. Such a controller may be implemented in hardware or a combination of hardware and software and/or firmware. Functions associated with any particular controller may be centralized or distributed, either locally or remotely. The phrase "at least one", when used with a list of items, denotes that different combinations of one or more of the listed items may be used, and that only one item in the list may be required. For example, "at least one of A, B, and C" includes any one of combinations of A, B, C, A and B, A and C, B and C, and A, B and C.

In addition, various functions described below may be implemented or supported by artificial intelligence technology or one or more computer programs, and each of the programs consists of computer-readable program code and is embodied in a computer-readable medium. The terms "application" and "program" refer to one or more computer programs, software components, sets of instructions, procedures, functions, objects, classes, instances, related data, or portions thereof suitable for implementation of suitable computer-readable program code. The term "computer-readable program code" includes computer code of any type, including source code, object code, and executable code. The term "computer-readable medium" includes any type of medium that may be accessed by a computer, such as read only memory (ROM), random access memory (RAM), a hard disk drive, a compact disk (CD), a digital video disk (DVD), or any other type of memory. A "non-transitory" computer-readable medium excludes wired, wireless, optical, or other communication links that transmit transitory electrical or other signals. Non-transitory computer-readable media includes media in which data may be permanently stored, and media in which data is stored and may be overwritten later, such as a rewritable optical disc or a removable memory apparatus.

In various example embodiments described below, a hardware approach is described as an example. However, because various example embodiments include technology using both hardware and software, the various example embodiments do not exclude a software-based approach.

In addition, terms referring to control information, terms referring to entries, terms referring to network entities, terms referring to messages, and terms referring to a component of an apparatus, used in the description to be described below, are examples for convenience of description. Accordingly, the example embodiments are not limited to the terms described below, and other terms having equivalent technical meanings may be used.

FIG. 1 is a diagram illustrating a wireless communication system 10 according to an example embodiment. In detail, FIG. 1 shows a wireless local area network (WLAN) system as an example of the wireless communication system 10.

Referring to FIG. 1, the wireless communication system 10 may include a first access point AP1 and a second access point AP2, a first station STA1, a second station STA2, a third station STA3, and a fourth station STA4. The first and second access points AP1 and AP2 may connect to a network 13 including the Internet, an internet protocol (IP) network, or any other network. The first access point AP1 may provide the first station STA1, the second station STA2, the third station STA3, and the fourth station STA4 with access to the network 13 within a first coverage area 11, and the second access point AP2 may also provide the third and fourth stations STA3 and STA4 with access to the network 13 within a second coverage area 12. In some example embodiments, the first and second access points AP1 and AP2 may communicate with at least one of the first station STA1, the second station STA2, the third station STA3, and the fourth station STA4, based on wireless fidelity (WiFi) or any other WLAN access technology.

The access point may be referred to as a router, a gateway, and the like, and the station may be referred to as a mobile station, a subscriber station, a terminal, a mobile terminal, a wireless terminal, user equipment, a user, and the like. The station may be a portable apparatus, such as a mobile phone, a laptop computer, a wearable apparatus, or the like, or a stationary apparatus, such as a desktop computer, a smart TV, or the like. In this specification, the access point may be referred to as a first apparatus, and the station may be referred to as a second to a fourth apparatus.

The access point may allocate at least one resource unit (RU) to at least one station. The access point may transmit data through the allocated at least one RU, and the at least one station may receive data through the allocated at least one RU. In 802.11ax (hereafter high efficiency (HE)), the access point may allocate only a single RU to at least one station, while in 802.11be (hereafter EHT) or next-generation IEEE 802.11 standards (hereafter EHT+), the access point may allocate a multi-resource unit (MRU) including two or more RUs to at least one station. For example, the first access point AP1 may allocate a MRU to at least one of the first station STA1, the second station STA2, the third station STA3, and the fourth station STA4, and may transmit data through the allocated MRU. That is, for example, a first station STA1 may have allocated to the first station STA1 by the first access point AP1 a MRU including two or more RUs, and the second station STA2 may have allocated to the second station STA2 by the first access point AP1 a MRU including two or more RUs, and so on.

In some example embodiments, the access point may communicate with the at least one station based on beamformimg. For example, single-user beamforming may improve reception performance of a single user, and multi-user beamforming may improve reception performance of multiple users by removing interference between the multiple users. The access point and the station may perform channel sounding for beamforming, and the channel sounding may be based on a sounding protocol. As described below with reference to the drawings, even when the access point performs channel sounding with stations supporting various protocol standards (e.g., EHT, EHT+, etc.), the access point and the stations may efficiently perform channel sounding.

In an example embodiment, the access point may transmit an aggregated physical layer protocol data unit (PPDU) including a null data packet (NDP) based on the EHT protocol standard and an NDP based on the EHT+ protocol standard to the stations. For the above transmission, the NDP based on the EHT+ protocol standard may have the same duration in different bands to be aggregated with the NDP based on the EHT protocol standard, respectively. For example, the total number of bits of the NDP based on to the EHT+ protocol standard may be the same as the total number of bits of the NDP based on the EHT protocol standard. For example, the NDP based on the EHT+ protocol standard may include an (EHT+)-SIG field corresponding to one symbol, and the NDP based on the EHT protocol standard may include an EHT-SIG field corresponding to one symbol. For example, the number of fields included in the NDP based on the EHT+ protocol standard may be the same as the number of fields included in the NDP based on the EHT protocol standard.

Figure 2:
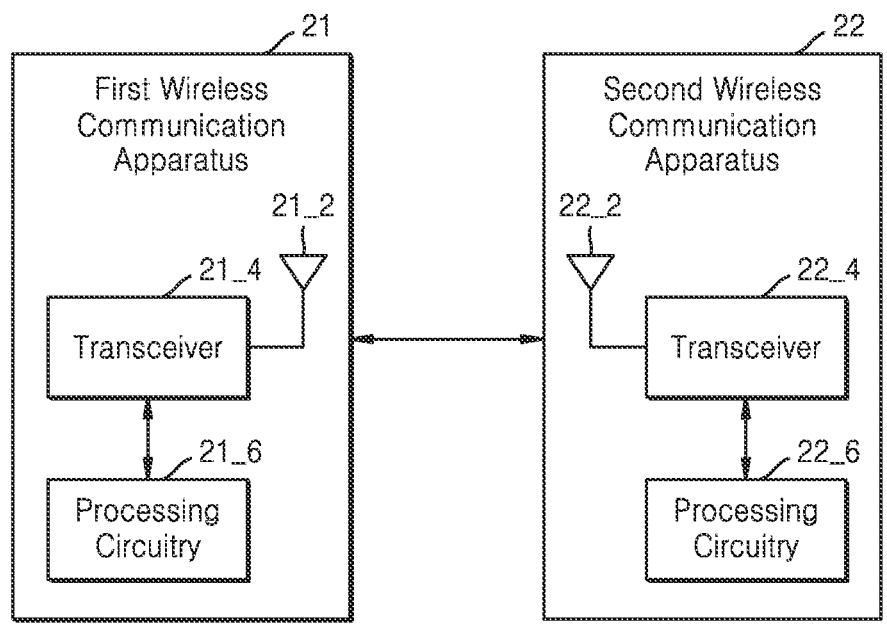
FIG. 2 is a block diagram illustrating a wireless communication system according to an example embodiment.

FIG. 2 is a block diagram illustrating a wireless communication system 20 according to an example embodiment. In detail, the block diagram of FIG. 2 shows a first wireless communication apparatus 21 and a second wireless communication apparatus 22 that communicate with each other in the wireless communication system 20. Each of the first wireless communication apparatus 21 and the second wireless communication apparatus 22 of FIG. 2 may be any apparatus communicating in the wireless communication system 20 and may be referred to as an apparatus for wireless communication. In some example embodiments, each of the first wireless communication apparatus 21 and the second wireless communication apparatus 22 may be an access point or station of a WLAN system.

Referring to FIG. 2, the first wireless communication apparatus 21 may include an antenna 21_2, a transceiver 21_4, and processing circuitry 21_6. In some example embodiments, the antenna 21_2, the transceiver 21_4, and the processing circuitry 21_6 may be included in one package or may be included in different packages, respectively. The second wireless communication apparatus 22 may also include an antenna 22_2, a transceiver 22_4, and processing circuitry 22_6. Hereinafter, descriptions already given of the first wireless communication apparatus 21 and the second wireless communication apparatus 22 are omitted.

The antenna 21_2 may receive a signal from the second wireless communication apparatus 22 and provide the received signal to the transceiver 21_4, and may transmit the signal provided from the transceiver 21_4 to the second wireless communication apparatus 22. In some example embodiments, the antenna 21_2 may include a plurality of antennas for multiple input multiple output (MIMO). In addition, in some example embodiments, the antenna 21_2 may include a phased array for beamforming.

The transceiver 21_4 may process a signal received from the second wireless communication apparatus 22 through the antenna 21_2, and may provide the processed signal to the processing circuitry 21_6. In addition, the transceiver 21_4 may process the signal provided from the processing circuitry 21_6 and output the processed signal through the antenna 21_2. In some example embodiments, the transceiver 21_4 may include one or more analog circuits such as a low noise amplifier, a mixer, a filter, a power amplifier, an oscillator, and the like. In some example embodiments, the transceiver 21_4 may process a signal received from the antenna 21_2 and/or a signal received from the processing circuitry 21_6 based on the control of the processing circuitry 21_6.

The processing circuitry 21_6 may extract information transmitted by the second wireless communication apparatus 22 by processing the signal received from the transceiver 21_4. For example, the processing circuitry 21_6 may extract information by demodulating and/or decoding a signal received from the transceiver 21_4. In addition, the processing circuitry 21_6 may generate a signal including information to be transmitted to the second wireless communication apparatus 22 and provide the signal to the transceiver 21_4. For example, the processing circuitry 21_6 may provide a signal generated by encoding and/or modulating data to be transmitted to the second wireless communication apparatus 22 to the transceiver 21_4. In some example embodiments, the processing circuitry 21_6 may include a programmable component such as a central processing unit (CPU), a digital signal processor (DSP), and the like, may include reconfigurable components, such as field programmable gate arrays (FPGAs), and may include a component that provides a fixed function, such as an intellectual property (IP) core. In some example embodiments, the processing circuitry 21_6 may include or access memory that stores data and/or a series of instructions. In this specification, that the transceiver 21_4 and/or the processing circuitry 21_6 perform operations may simply be referred to as the first wireless communication apparatus 21 performs the corresponding operations. Accordingly, operations performed by the access point may be performed by the transceiver and/or processing circuitry included in the access point, and operations performed by the station may be performed by transceivers and/or processing circuitry included in the station.

Figure 3:
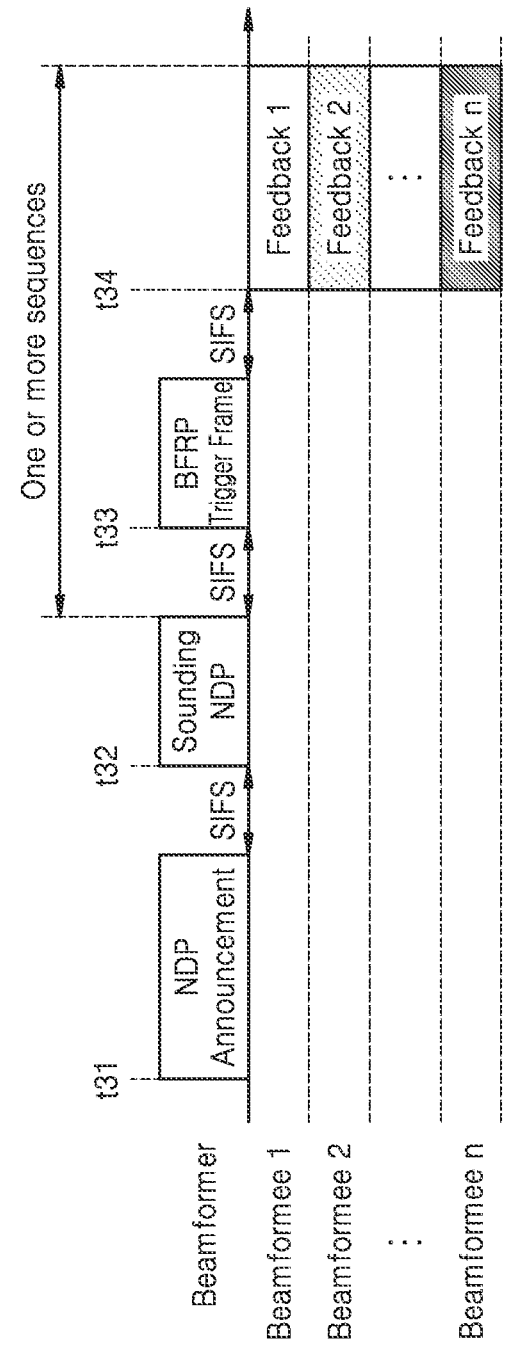
FIG. 3 is a timing diagram illustrating channel sounding according to an example embodiment.

FIG. 3 is a timing diagram illustrating channel sounding according to an example embodiment. In detail, the timing diagram of FIG. 3 shows channel sounding performed by a beamformer and first to n-th beamformees (n is an integer greater than 1). In the example of FIG. 3, the first to n-th beamformees may support different protocol standards, respectively. In some example embodiments, the beamformer may be an access point, and each of the first to n-th beamformees may be a station. However, this is only an example and it is noted that the example embodiments are not limited to the channel sounding of FIG. 3.

The sounding protocol may refer to a procedure for the beamformer to receive channel state information provided as feedback from the beamformee. Referring to FIG. 3, at time t31, the beamformer may provide an Null Data physical layer protocol data unit (PPDU) (NDP) announcement frame to the first to n-th beamformees. For example, the access point may provide the NDP announcement frame indicating transmission of a sounding NDP to the first to n-th beamformees in order to obtain downlink channel state information. The NDP announcement frame may be a control frame, and the first to n-th beamformees may prepare to receive the sounding NDP based on the NDP announcement frame. An example of the NDP announcement frame is described below with reference to FIGS. 4A to 4C.

At time t32, the beamformer may transmit the sounding NDP to the first to n-th beamformees. For example, after providing the NDP announcement frame to the first to n-th beamformees, the access point may transmit the sounding NDP to the first to n-th beamformees after a short interframe space (SIFS) time. The first to n-th beamformees may estimate a downlink channel based on the sounding NDP and may generate information on the channel state.

In example embodiments, as described below with reference to FIGS. 5A and 5B, an aggregated PPDU including NDPs respectively corresponding to different protocol standards may be provided to the first to n-th beamformees. In an example embodiment, the protocol standards may include an EHT protocol standard and an EHT+ protocol standard. The aggregated PPDU may include at least one NDP based on the EHT protocol standard and at least one NDP based on the EHT+ protocol standard. NDPs included in the aggregated PPDU may be provided to the first to n-th beamformees through different bands.

Based on the aggregated PPDU, at least one of the first to n-th beamformees may perform channel estimation based on the EHT protocol standard, and at least another of the first to n-th beamformees may perform channel estimation based on the EHT+ protocol standard. As a result, channel sounding with beamformees supporting the EHT protocol standard and the EHT+ protocol standard is simultaneously performed, thereby reducing the time required for channel sounding.

At time t33, the beamformer may provide a beamforming report poll (BFRP) trigger frame to the first to n-th beamformees. For example, the beamformer may provide the BFRP trigger frame to the first to n-th beamformees after a SIFS. In some embodiments, the BFRP trigger frame may also be referred to as an EHT/EHT+ trigger frame. For example, after transmitting the sounding NDP to the first to n-th beamformees, the access point may provide the BFRP trigger frame for triggering uplink transmission of the first to n-th beamformees to the first to n-th beamformees. The BFRP trigger frame may include information necessary for the first to nth beamformees to provided channel state information to the beamformer as feedback, that is, the access point. For example, the BFRP trigger frame may include information on resources to be used in uplink transmission. In addition, the BFRP trigger frame may include at least one of information commonly used for users conforming to the EHT protocol standard and information commonly used for users conforming to the EHT+ protocol standard. A specific embodiment thereof is described below with reference to FIGS. 9A, 9B, 10A, and 10B.

At time t34, the first to n-th beamformees may provide the first to n-th feedback frames to the beamformer. For example, the first to n-th beamformees may provide the first to n-th feedback frames to the beamformer after a SIFS. It is noted that, in example embodiments, the SIFS in FIG. 3 may be the same time or may be different times. In some embodiments, each of the first to n-th beamformees may transmit a compressed beamforming/channel quality indicator (CQI) frame including channel state information generated by channel estimation to the beamformer. The compressed beamforming/CQI frame may include information about a signal-to-noise ratio (SNR) for a space-time stream and a compressed beamforming feedback matrix for a subcarrier. In an example embodiment, the beamformer may receive an aggregated PPDU including first to n-th feedback frames, and the first to n-th feedback frames may be received through different bands. As an example, bands in which the first to nth feedback frames are transmitted may correspond to bands in which NDPs corresponding to different protocol standards included in the sounding NDP are transmitted. For example, when receiving the NDP based on the EHT+ protocol standard through a first band, the first beamformee may transmit a first feedback frame to the beamformer through the first band.

Figure 4A:
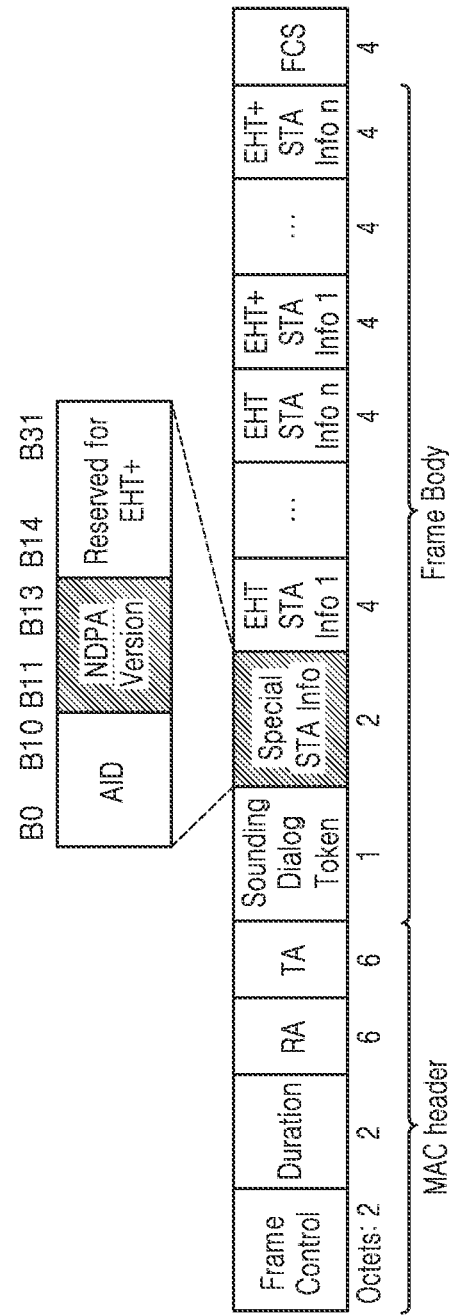
FIGS. 4A and 4B are diagrams illustrating a null data packet (NDP) announcement frame according to an example embodiments.
Figure 4B:
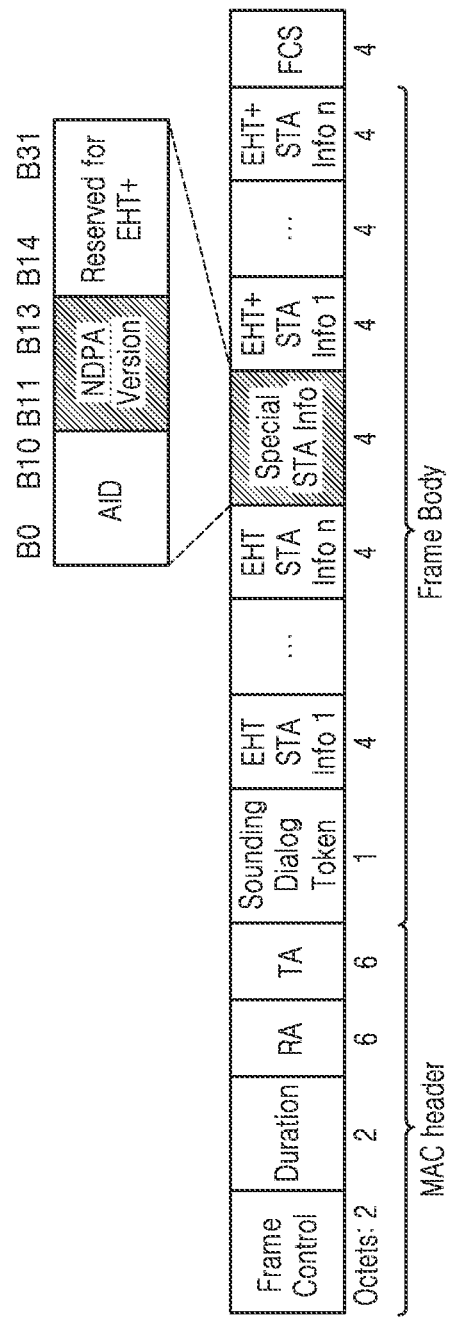

FIGS. 4A and 4B are diagrams illustrating an NDP announcement frame according to example embodiments, and FIG. 4C is a diagram illustrating a sounding dialog token field included in an NDP announcement frame, according to an example embodiment. Hereinafter, the NDP announcement frame is referred to as an NDPA frame. In some example embodiments, the NDPA frame of FIGS. 4A and 4B may be used in the EHT protocol standard and the EHT+ protocol standard. However, example embodiments are not limited to those illustrated in FIGS. 4A to 4C.

As shown in FIG. 4A, the NDPA frame may include a MAC header, a frame body, and a frame check sequence (FCS) field. The NDPA frame may include a frame control field, a duration field, an RA field, and a TA field in the MAC header, and may include a sounding dialog token field, a special STA information (info) field, n (where n is an integer greater than zero) EHT STA information (info) fields, and n EHT+ STA information (info) fields in the frame body. The NDPA frame may include information for beamformees to perform channel sounding.

The frame control field may include information about a version of a media access control (MAC) protocol and other additional control information. The duration field may include time information for setting a network allocation vector (NAV) or information about a user identifier, for example, an association identifier (AID). The RA field may include address information of a beamformee that receives the NDPA frame, and the TA field may include address information of a beamformer that transmits the NDPA frame. In some example embodiments, the sounding dialog token field may be referred to as a sounding sequence field and may include identification information on an NDPA frame as described below. In some example embodiments, the STA information (info) field may be referred to as a user information field, and the NDPA frame may include the special STA information (info) field, and the first to n-th EHT STA information (info) fields and the first to n-th EHT+ STA information (info) fields, corresponding to the first to n-th beamformees receiving the NDPA frame.

In some example embodiments, the special STA information (info) field may include information indicating whether information is actually included in the EHT+ STA information (info) fields and information commonly used for beamformees (or users) to perform channel estimation based on the EHT+ protocol standard. In detail, the special STA information (info) field may include an association identifier (AID) subfield having a specific value indicating that the special STA information (info) field is a special STA information field, an NDPA version subfield including at least one of release information and standard amendment information of the EHT+ protocol standard, and a reserved for EHT+ subfield for the EHT+ protocol standard. As an example, the association identifier (AID) subfield of the special STA information (info) field may be composed of 11 bits and may have any one of values '2007' to '2047' that indicate the special STA information (info) field. The NDPA version subfield of the special STA information field may be composed of 3 bits and may have a value indicating a release version of the EHT+ protocol standard or a value indicating a standard revision version. Furthermore, the EHT+ protocol standard refers to all standards of the next generation of the EHT protocol standard and may have a value indicating the currently supported EHT+ protocol standard among various types of EHT+ protocol standards.

Each of the stations receiving the NDPA frame may identify whether the station is a beamformee conforming to the EHT protocol standard through an identifier included in the EHT STA information (info) field and may identify whether the station is a beamformee conforming to the EHT+ protocol standard through an identifier included in the EHT+ STA information (info) field. In an example embodiment, the special STA information (info) field may be arranged before the first to nth EHT STA information (info) fields and the first to n-th EHT+ STA information (info) fields in the NDPA frame. In other words, the order of the fields in the NDPA frame is not particularly limited. In addition, the special STA information (info) field may be arranged after the sounding dialog token field on the NDPA frame.

Referring further to FIG. 4B, compared with FIG. 4A, the special STA information (info) field may be arranged between the first to nth EHT STA information fields and the first to nth EHT+ STA information fields on the NDPA frame. That is, because the special STA information (info) field includes common information regarding the EHT+ protocol standard, the special STA information (info) field may be arranged before the first to n-th EHT+ STA information (info) fields on the NDPA frame. On the other hand, the arrangement example of the special STA information (info) field shown in FIGS. 4A and 4B is only an example embodiment, and example embodiments are not limited thereto, and in various example embodiments may be arranged in various positions.

Referring further to FIG. 4C, for an aggregated PPDU including a plurality of NDPs, the sounding dialog token field may have a value corresponding to two or more standards in common. For example, as shown in the table of FIG. 4C, the sounding dialog token field may include 2-bits 'B0, B1' indicating a protocol standard on which the NDPA frame is based. In some example embodiments, bit 'B0' may be referred to as a 'Ranging' bit and bit 'B1' may be referred to as an 'EH/VHT' bit. As shown in FIG. 4C, 2-bit '00' may indicate an 802.11ac NDPA frame called very high throughput (VHT), '01' may indicate an HE NDPA frame, '10' may indicate a 'Ranging' NDPA frame, that is, an 802.11az NDPA frame, and '11' may indicate an EHT NDPA frame and an EHT+ NDPA frame. Accordingly, a station supporting the EHT protocol standard (hereinafter, an EHT station) and a station supporting the EHT+ protocol standard (hereinafter, an EHT+ station) may identify an NDPA frame in common and may estimate the channel based on the aggregated PPDU including the NDPs.

Hereinafter, example embodiments will be described mainly with reference to an example in which the EHT protocol standard and the EHT+ protocol standard correspond to a common value in the sounding dialog token field as shown in FIG. 4C. However, it will be understood that the example embodiments may be applied between any different protocol standards.

Figure 5B:
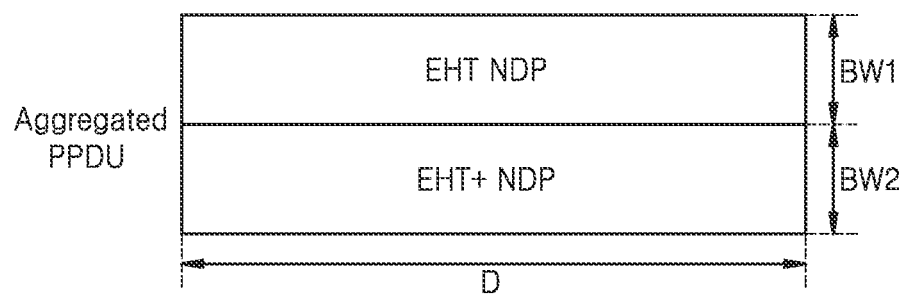
FIG. 5B is a diagram illustrating an aggregated physical layer protocol data unit (PPDU) including an EHT NDP and an EHT+ NDP according to an example embodiment.

FIG. 5A is a diagram showing a structure of an EHT NDP and a structure of an EHT+ NDP according to an example embodiment, and FIG. 5B is a diagram illustrating an aggregated PPDU including an EHT NDP and an EHT+ NDP according to an example embodiment.

Referring to FIG. 5A, the EHT NDP may include a legacy-short training field (L-STF), a legacy-long training field (L-LTF), a legacy-signal (L-SIG) field, a repeated legacy-signal (RL-SIG) field, a universal signal (U-SIG) field, an extremely high throughput-signal (EHT-SIG) field, an extremely high throughput-short training field (EHT-STF), an extremely high throughput-long training (EHT-LTF) field, and a packet extension (PE) field.

The L-STF may include a short training OFDM symbol, and may be used for frame detection, automatic gain control (AGC), diversity detection, and coarse frequency/time synchronization. The L-LTF may include a long training OFDM symbol, and may be used for fine frequency/time synchronization and channel estimation. The L-SIG field may be used for transmission of control information, and may include information on a data rate and a data length. In some example embodiments, the L-SIG field may be repeated in the RL-SIG field.

The U-SIG field may include control information common to at least one user receiving the EHT NDP, and an example of the U-SIG field is described below with reference to FIG. 6. The EHT-SIG field may have a variable modulation and coding scheme (MCS) and length, and an example of the EHT-SIG described below with reference to FIG. 7. The EHT-STF may be provided to perform AGC to a user receiving the EHT NDP.

The EHT+ NDP may include an L-STF, an L-LTF, an L-SIG field, an RL-SIG field, a U-SIG field, an (EHT+)-SIG field, an (EHT+)-STF, an (EHT+)-LTF, and a PE field. In some example embodiments, the (EHT+)-SIG field may include some different subfields from the EHT-SIG field. In other example embodiments, the (EHT+)-SIG field may include the same subfields as the EHT-SIG field. In an example embodiment, the EHT+ NDP may include an (EHT+)-SIG field corresponding to one symbol so that the EHT NDP corresponds to a configuration including the EHT-SIG field corresponding to one symbol. Through this configuration, the EHT NDP may have the same duration (D) as a duration of the EHT+ NDP. That is, the total number of bits or the length of the EHT NDP and the total number of bits or the length of the EHT+ NDP may be the same. Because the EHT NDP and the EHT+ NDP have the same duration (D), beamformees receiving the EHT NDP and the EHT+ NDP may respectively transmit a feedback frame to a beamformer at a same timing.

In some example embodiments, the (EHT+)-STF may include some different subfields from the subfields included in the EHT-STF. In other example embodiments, the (EHT+)-STF may include the same subfields as the subfields included in the EHT-STF. In some example embodiments, the (EHT+)-LTF may include some different subfields from the subfields included in the EHT-LTF. In other example embodiments, the (EHT+)-LTF may include the same subfields as the subfields included in the EHT-LTF.

However, the EHT+ NDP shown in FIG. 5A is only an example embodiment and example embodiments are not limited thereto. In order to generate an aggregated PPDU including the EHT NDP and the EHT+ NDP, the EHT+ NDP may be implemented in various ways to have a configuration consistent with the configuration of the EHT NDP.

Referring further to FIG. 5B, after the beamformer (e.g., an access point) transmits the NDPA frame, the beamformer may transmit an aggregated PPDU including a plurality of NDPs corresponding to the EHT protocol standard and the EHT+ protocol standard to a plurality of beamformees (e.g., stations). As shown in FIG. 5B, the aggregated PPDU may include the EHT NDP and the EHT+ NDP. In some example embodiments, different from that shown in FIG. 5B, the aggregated PPDU may include more than two NDPs.

In an example embodiment, a plurality of NDPs included in the aggregated PPDU may be transmitted through different frequency bands, respectively. For example, as shown in FIG. 5B, the EHT NDP may be transmitted through a first band BW1, and the EHT+ NDP may be transmitted through a second band BW2. In some example embodiments, the first band BW1 and the second band BW2 may have a same bandwidth or different bandwidths based on the frequency axis.

In an example embodiment, NDPs included in the aggregated PPDU may have a same duration. For example, as shown in FIG. 5B, the EHT NDP and the EHT+ NDP may have the same duration (D).

FIG. 6 is a diagram illustrating an example of a U-SIG field according to an example embodiment, and FIG. 7 is a diagram illustrating an example of an EHT-SIG field according to an example embodiment. The table of FIG. 6 indicates subfields of the U-SIG included in the NDP based on the EHT protocol standard, and the table of FIG. 7 shows subfields of a common information field of the EHT-SIG included in the NDP based on the EHT protocol standard.

Referring to FIG. 6, the U-SIG field of the EHT NDP (see FIG. 5A) may consist of a 26-bit U-SIG-1 and a 26-bit U-SIG-2, and each of U-SIG-1 and U-SIG-2 may correspond to one symbol. Each of U-SIG-1 and U-SIG-2 may include a plurality of subfields defined in the EHT protocol standard. For example, as shown in FIG. 6, the U-SIG-1 may include 'PHY Version Identifier', 'BW', 'UL/DL', 'BSS Color', 'TXOP', 'Disregard', and 'Validate' subfields. In addition, the U-SIG-2 may include 'PPDU Type And Compression Mode', 'Validate', 'Punctured Channel Info', 'Validate', 'EHT-SIG MCS', 'Number of EHT-SIG Symbols', 'CRC', and 'Tail' subfields.

In addition, in some example embodiments, the U-SIG field of the EHT+ NDP may include the same subfields as the U-SIG field of the EHT NDP shown in FIG. 6. In other example embodiments, the U-SIG field of the EHT+ NDP may include subfields that are at least partially different from the subfields included in the U-SIG field of the EHT NDP shown in FIG. 6. In addition, the U-SIG field of the EHT+ NDP may be adjusted to have a length that matches the length of the U-SIG field of the EHT NDP shown in FIG. 6.

Referring further to FIG. 7, the common information field of the EHT-SIG field may include a plurality of subfields defined in the EHT protocol standard. For example, as shown in FIG. 7, the common information fields of the EHT-SIG field may include 'Spatial Reuse', 'GI+LTF Size', 'Number of EHT-LTF Symbols', 'NSS', 'Beamformed', 'Disregard', 'CRC', and 'Tail' subfields.

In some example embodiments, the (EHT+)-SIG field of FIG. 5A may include the same subfields as a plurality of subfields of the EHT-SIG field. In other example embodiments, the (EHT+)-SIG field of FIG. 5A may include at least some different subfields from the plurality of subfields of the EHT-SIG field. In addition, the (EHT+)-SIG field of FIG. 5A may be adjusted to have a length that matches the length of the EHT-SIG field. Through this configuration, the EHT+ NDP may have the same duration as a direction of the EHT NDP.

Figure 8:
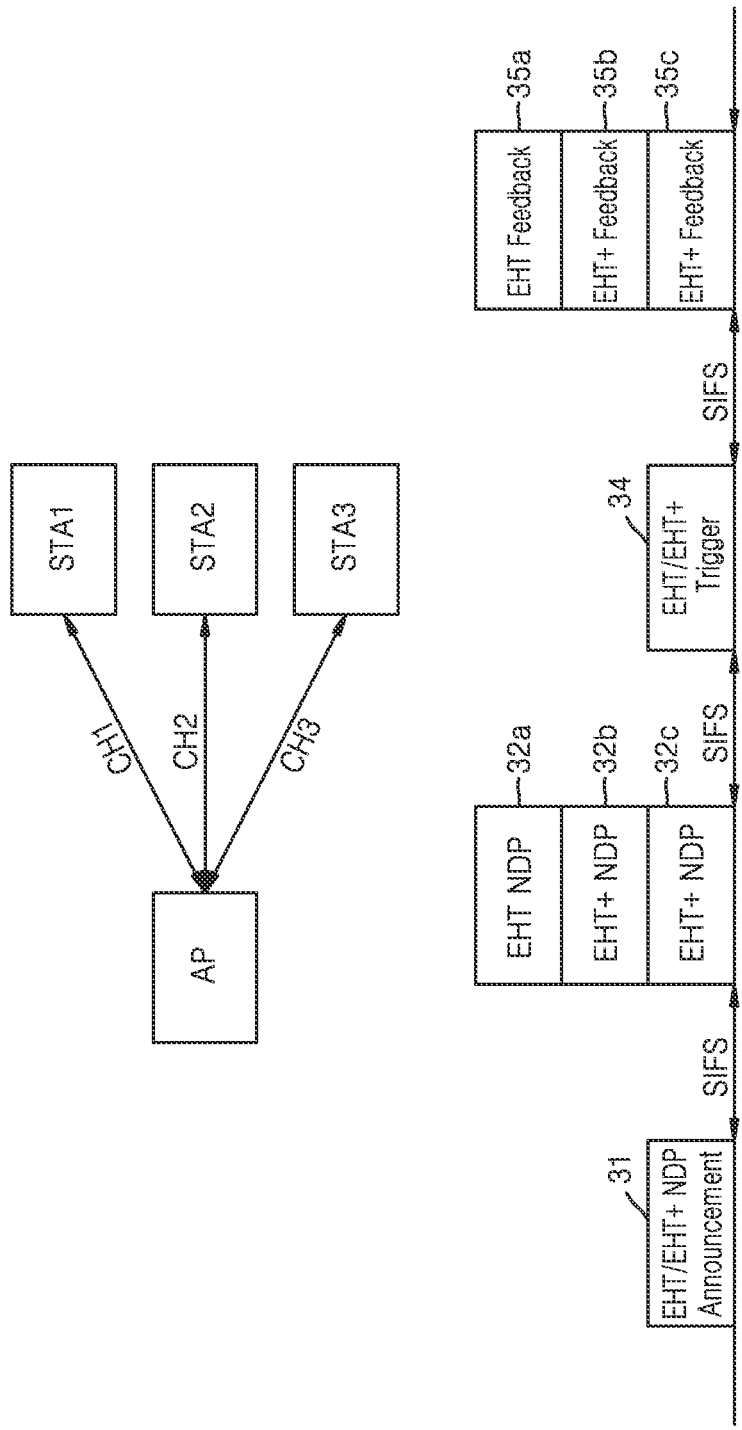
FIG. 8 is a timing diagram illustrating channel sounding according to an example embodiment.

FIG. 8 is a timing diagram illustrating channel sounding according to an example embodiment. In detail, the timing diagram of FIG. 8 shows channel sounding performed by the access point AP and the first to third stations STA1 to STA3 (see FIG. 1) by way of an example. The access point AP may perform channel sounding to obtain feedback on the first to third channels CH1 to CH3 respectively corresponding to the first to third stations STA1 to STA3.

The access point AP may transmit an EHT/EHT+ NDPA 31 informing the transmission of the first aggregated PPDU to the first to third stations STA1 to STA3. As mentioned above, the EHT/EHT+ NDPA 31 may include information for the first station STA1 to identify the EHT NDP 32a, the second station STA2 to identify the EHT+ NDP 32b, and the third station STA3 to identify the EHT+ NDP 32c, and various information about the EHT+ protocol standard. The various information may be used for channel estimation of a station supporting the EHT+ protocol standard.

The access point AP may transmit the first aggregated PPDU including one EHT NDP 32a and two EHT+ NDPs 32b and 32c to the first to third stations STA1 to STA3 after an SIFS time. In addition, a duration of the EHT NDP 32a and a duration of each of the EHT+ NDPs 32b and 32c may be the same duration, and the EHT NDP 32a and the EHT+ NDPs 32b and 32c may be transmitted through different bands. The first station STA1 may identify the EHT NDP 32a and estimate the first channel CH1 using the identified EHT NDP 32a. The second station STA2 may identify the EHT+ NDP 32b and estimate the second channel CH2 using the identified EHT+ NDP 32b. The third station STA3 may identify the EHT+ NDP 32c and estimate the third channel CH3 using the identified EHT+ NDP 32c.

The access point AP may transmit an EHT/EHT+ trigger frame 34 to the first to third stations STA1 to STA3 for triggering uplink transmission of the first to third stations STA1 to STA3 after the SIFS time. In some example embodiments, the EHT/EHT+ trigger frame 34 may be included in the PPDU and transmitted to the first to third stations STA1 to STA3. On the other hand, a specific configuration example of the EHT/EHT+ trigger frame 34 is described below with reference to FIGS. 9A, 9B, 10A and 10B. The EHT/EHT+ trigger frame 34 may include information on resources to be used in uplink transmission, and the first to third stations STA1 to STA3 may transmit feedback frames 35a, 35b, and 35c to the access point AP, respectively, with reference to the information on the resources.

The first station STA1 may transmit an EHT feedback frame 35a and the second and third stations STA2 and STA3 may transmit EHT+ feedback frames 35b and 35c to the access point AP, respectively, after the SIFS time. The PPDU including the EHT feedback frame 35a and the EHT+ feedback frames 35b and 35c may be referred to as a second aggregated PPDU, and the access point AP may receive the second aggregated PPDU and perform beamforming based on the received PPDU. In some example embodiments, the EHT feedback frame 35a may be transmitted through a band corresponding to the band in which the EHT NDP 32a is transmitted, and the EHT+ feedback frames 35b and 35c may be transmitted through a band corresponding to a band in which the EHT+ NDPs 32b and 32c, respectively, are transmitted.

FIGS. 9A to 10B are diagrams illustrating configuration examples of the EHT/EHT+ trigger frame of FIG. 8 according to various example embodiments.

Referring to FIG. 9A, the EHT/EHT+ trigger frame may include a common information (info) field, EHT special STA information (info) field, EHT+ special STA information (info) field, first to n-th EHT STA information' (info) fields, and first to n-th EHT+ STA information' (info) fields. In an example embodiment, the common information field may include information commonly used for stations (or users) to transmit a feedback frame. As an example, the common information field may be composed of 'special user info field present, 'reserved', and 'trigger dependent common info'. The EHT special STA information (info) field may include information commonly used for stations conforming to the EHT protocol standard, and the EHT+ special STA information (info) field may include information commonly used for stations conforming to the EHT+ protocol standard. In some example embodiments, the first to nth EHT STA information' (info) fields and the first to nth EHT+ STA information' (info) fields may include user identifier information, uplink forward error correction (FEC) type, uplink modulation coding scheme (MCS) level, uplink transmission power, transmission band allocation information, and the like. In addition, without being limited thereto, the first to n-th EHT STA information' (info) fields and the first to n-th EHT+ STA information' (info) fields may include fields conforming to the standard.

In an example embodiment, the EHT special STA information (info) field and the EHT+ special STA information (info) field may be located before the first to nth EHT STA information' (info) fields and first to nth EHT+ STA information' (info) fields in the EHT/EHT+ trigger frame.

Referring further to FIG. 9B, compared with FIG. 9A, the EHT special STA information (info) field may be located before the first to n-th EHT STA information' (info) fields in the EHT/EHT+ trigger frame, and the EHT+ special STA information (info) field may be located between the first to nth EHT STA information' (info) fields and the first to nth EHT+ STA information' (info) fields.

Referring further to FIG. 10A, depending on the release version of the protocol standard, in some example embodiments the EHT special STA information (info) field may be omitted from the EHT/EHT+ trigger frame. On the other hand, the EHT+ special STA information (info) field may be arranged ahead of the first to nth EHT STA information' (info) fields and the first to nth EHT+ STA information' (info) fields in the EHT/EHT+ trigger frame.

Referring further to FIG. 10B, compared with FIG. 10A, in some example embodiments, the EHT+ special STA information (info) field may be arranged between the first to n-th EHT STA information' (info) fields and the first to n-th EHT+ STA information' (info) fields.

Figure 11A:
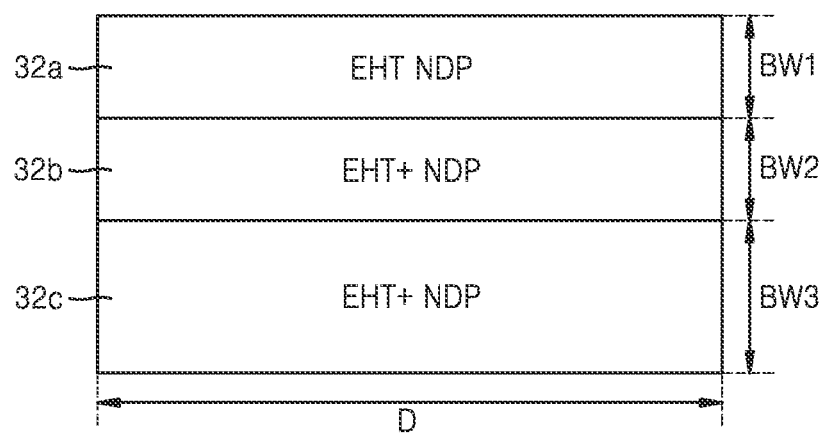
FIGS. 11A to 11C are diagrams for explaining first to third aggregated PPDUs according to various example embodiments.
Figure 11B:
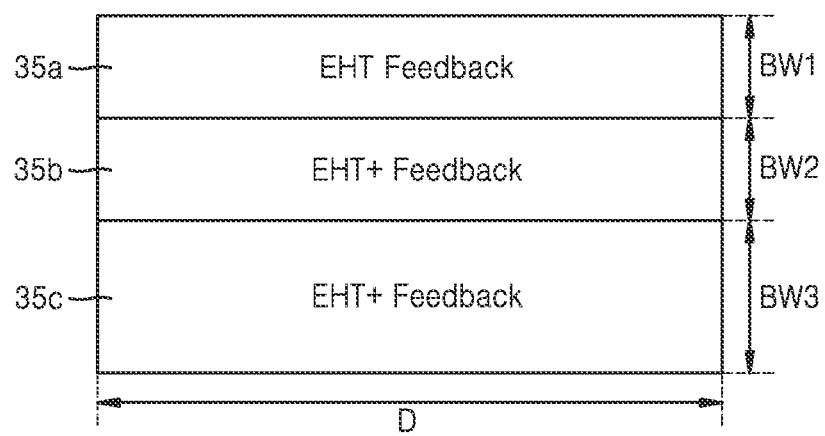
Figure 11C:
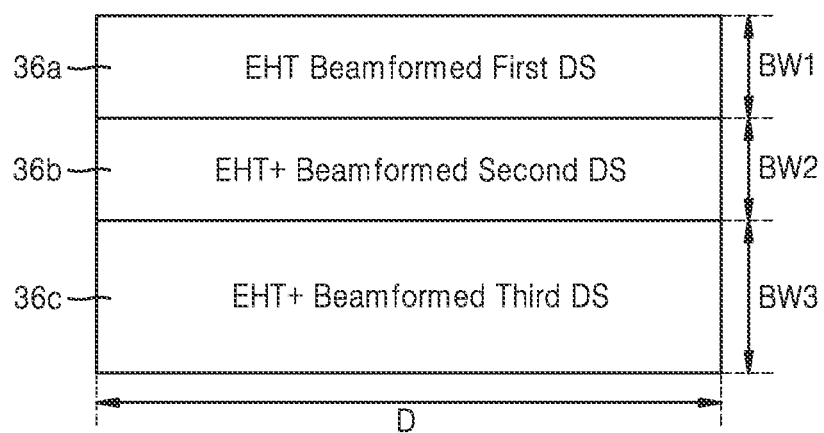

FIGS. 11A to 11C are diagrams for explaining first to third aggregated PPDUs according to various example embodiments. In the following, further reference is made to FIG. 8 for better understanding.

Referring to FIG. 11A, in some example embodiments, the first aggregated PPDU may include one EHT NDP 32a and two EHT+ NDPs 32b and 32c having the same duration D, respectively. The EHT NDP 32a may be transmitted in the first band BW1, and the EHT+ NDP 32b and 32c may be transmitted in second and third bands BW2 and BW3, respectively. For example, the first band BW1 and the second band BW2 may have the same bandwidth, and the first and second bands BW1 and BW2 may have different bandwidths from the bandwidth of the third band BW3. However, this is only an example embodiment, and example embodiments are not limited thereto. In some example embodiments, the first aggregated PPDU may include more NDPs, and some of the bands in which each NDP is transmitted may have the same bandwidth or different bandwidths.

Referring further to FIG. 11B, in some example embodiments, the second aggregated PPDU may include an EHT feedback frame 35a generated from the first station STA1, an EHT+ feedback frame 35b generated from the second station STA2, and an EHT+ feedback frame 35c generated from the third station STA3. The EHT feedback frame 35a may be transmitted through the first band BW1, and the EHT+ feedback frames 35b and 35c may be transmitted through the second and third bands BW2 and BW3, respectively. That is, each of the first to third stations STA1 to STA3 may transmit the feedback frame through a band corresponding to the band in which the identified NDP is transmitted. In some example embodiments, the band in which the NDP identified by the station is transmitted may be different from the band in which the feedback frame is transmitted. However, this is only an example embodiment, and example embodiments are not limited thereto. In some example embodiments, the second aggregated PPDU may include more feedback frames and some of the bands in which each feedback frame is transmitted may have the same bandwidth or different bandwidths.

Referring further to FIG. 11C, the third aggregated PPDU may include a beamformed first data signal (DS) 36a transmitted to the first station STA1, a beamformed second data signal (DS) 36b transmitted to the second station STA2, and a beamformed third data signal (DS) 36c transmitted to the third station STA3. In some example embodiments, the third aggregated PPDU may further include control signals transmitted through different bands to the first to third stations STA1 to STA3, respectively.

The beamformed first data signal (DS) 36a may be transmitted in the first band BW1, the beamformed second data signal (DS) 36b may be transmitted in the second band BW2, and the beamformed third data signal (DS) 36c may be transmitted in the third band BW3. However, this is only an example embodiment, and example embodiments are not limited thereto. In some example embodiments, the third aggregated PPDU may include more data signals than the data signals of the example embodiment illustrated in FIG. 11C, and some of the bands in which the respective data signals are transmitted may have the same bandwidth or different bandwidths.

Figure 12:
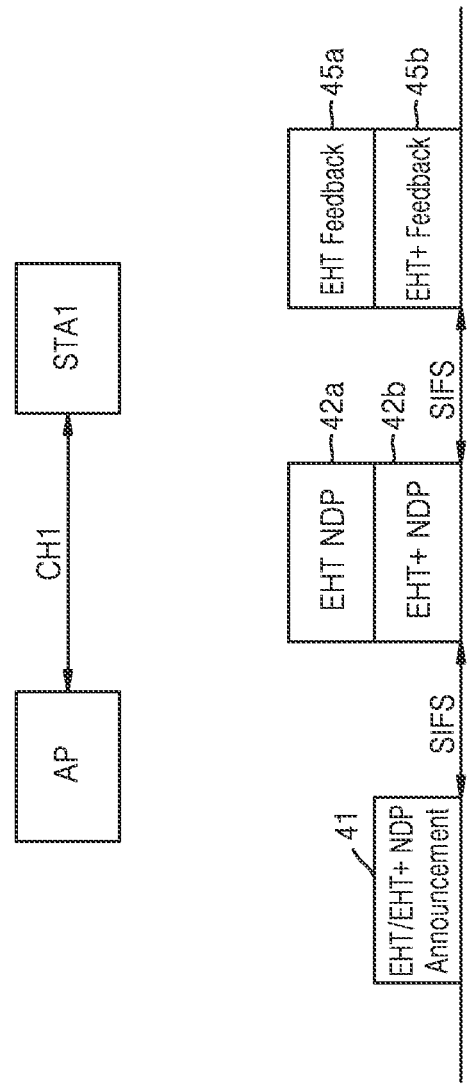
FIG. 12 is a timing diagram illustrating channel sounding according to an example embodiment.

FIG. 12 is a timing diagram illustrating channel sounding according to an example embodiment. In detail, the timing diagram of FIG. 12 shows channel sounding performed by an access point AP and a first station STA1. The access point AP may perform channel sounding to obtain feedback on a first channel CH1 corresponding to the first station STA1.

The access point AP may transmit an EHT/EHT+ NDPA 41 informing the transmission of a first aggregated PPDU to the first station STA1. As described above, the EHT/EHT+ NDPA 41 may include information used for the first station STA1 to identify an EHT NDP 42a or EHT+ NDP 42b and various information about the EHT+ protocol standard. The various information may be used for channel estimation of a station supporting the EHT+ protocol standard.

The access point AP may transmit the first aggregated PPDU including one EHT NDP 42a and one EHT+ NDP 42b to the first station STA1 after an SIFS time. On the other hand, the EHT NDP 42a and the EHT+ NDP 42b may have a same duration, and may be transmitted through different bands. The first station STA1 may identify the EHT NDP 42a or the EHT+ NDP 42b, and estimate the first channel CH1 using the identified EHT NDP 42a or the identified EHT+ NDP 42b. The first station STA1 may transmit an EHT feedback frame 45a or an EHT+ feedback frame 45b to the access point AP after the SIFS time. In FIG. 12, according to an example embodiment, signaling of the EHT/EHT+ trigger frame in FIG. 8 may be omitted.

Figure 13:
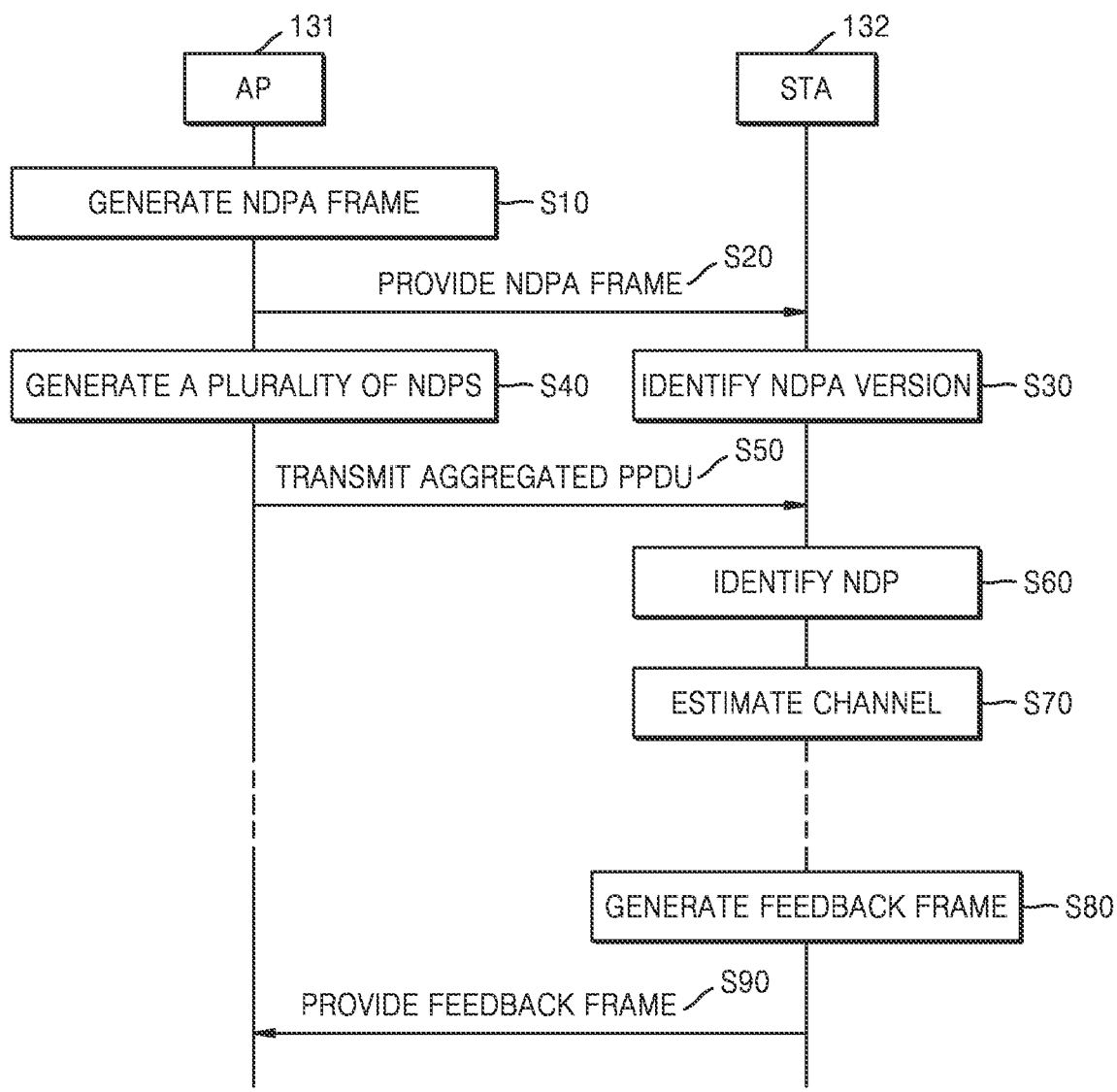
FIG. 13 is a message diagram illustrating a method for channel sounding based on an aggregated PPDU according to an example embodiment.

FIG. 13 is a message diagram illustrating a method for channel sounding based on an aggregated PPDU according to an example embodiment.

In detail, the message diagram of FIG. 13 illustrates the operations over time of an access point (AP) 131 as a beamformer and a station (STA) 132 as one of a plurality of beamformees. In some example embodiments, the access point 131 and the station 132 may communicate based on the NDAP frame and/or NDP described above with reference to FIGS. 1-12. As shown in FIG. 13, the method for channel sounding based on the aggregated PPDU may include a plurality of operations S10 to S90.

Referring to FIG. 13, in operation S10, the access point 131 may generate an NDPA frame. For example, the access point 131 may select a plurality of stations to perform channel sounding (or provide beamforming) among associated stations, and may generate the NDPA frame based on the selected plurality of stations. The NDPA frame may include a control frame, and the station 132 may prepare to receive a sounding NDP based on the NDPA frame. The NDPA frame may include a plurality of fields, and in particular, may include a sounding dialog token subfield including a value indicating a version of the NDPA frame, that is, a protocol standard on which the NDPA frame is based.

In order to provide NDPs to stations including the station 132 through the aggregated PPDU, the access point 131 may set the sounding dialog token subfield to a value that commonly represents different standard protocols, and may generate an NDPA frame including the set sounding dialog token subfield. Accordingly, in operation S50 to be described below, NDPs included in the aggregated PPDU transmitted to the station 132 may respectively correspond to the same or different protocol standards corresponding to a value included in the sounding dialog token subfield in common.

In operation S20, the access point 131 may provide the NDPA frame to the station 132. For example, the access point 131 may transmit the PPDU including the NDPA frame generated in operation S10 to the station 132, and the station 132 may receive the PPDU including the NDPA frame from the access point 131.

In operation S30, the station 132 may identify the NDPA version. For example, the station 132 may extract the NDPA frame from the PPDU received from the access point 131, and may identify the NDPA version, that is, the protocol standard corresponding to the NDPA frame, based on at least one field included in the NDPA frame. Accordingly, the station 132 may identify a protocol standard corresponding to the NDP subsequently received from the access point 131.

In operation S40, the access point 131 may generate a plurality of NDPs. The access point 131 may generate NDPs to be provided to the plurality of stations selected in operation S10. As described above, the plurality of NDPs may correspond to the same protocol standard, or may correspond to two or more different protocol standards that share the value of the sounding dialog token subfield. While operations S30 and S40 are illustrated in FIG. 13 as side-by-side, the operation 30 may occur at a same time or at a different time than the operation S40.

In operation S50, the access point 131 may transmit the aggregated PPDU to the station 132, and the station 132 may receive the aggregated PPDU from the access point. The plurality of stations including the station 132 may receive the aggregated PPDU, and each of the plurality of stations may process an NDP corresponding thereto in the aggregated PPDU.

In operation S60, the station 132 may identify the NDP. In some example embodiments, the station 132 may extract a field from the NDP corresponding to the station 132 in the aggregated PPDU, and identify that the PPDU received in operation S50 is an NDP based on the value of a subfield included in the extracted field. In some example embodiments, the station 132 may extract a field from the NDP corresponding to the station 132 in the aggregated PPDU, and may identify the NDP based on modulation schemes of symbols included in the extracted field.

In operation S70, the station 132 may perform channel estimation. For example, the station 132 may estimate a downlink channel based on the NDP received in operation S50. The station 132 may generate channel information based on the estimated channel, for example, a signal to noise ratio (SNR) for a space-time stream, and information about a compressed beamforming feedback matrix for a subcarrier.

In operation S80, the station 132 may generate a feedback frame. For example, the station 132 may generate the feedback frame including channel information generated through the channel estimation in operation S70. In some example embodiments, the station 132 may generate a compressed beamforming/channel quality indicator (CQI) frame as the feedback frame. In some example embodiments, the access point 131, after transmitting the aggregated PPDU in operation S50, may provide a BFRP trigger frame (or EHT/EHT+ trigger frame) to the plurality of stations including the station 132, where the BFRP trigger frame may trigger uplink transmission from the plurality of stations, and based on the BFRP trigger, the access point 131 may generate the feedback frame in response to the BFRP trigger frame.

In operation S90, the station 132 may provide the feedback frame to the access point 131. For example, the station 132 may generate a PPDU including the feedback frame, and may transmit the PPDU to the access point 131. In some example embodiments, the station 132 may generate the PPDU including the feedback frame and may transmit the PPDU to the access point based on information included in the BFRP trigger frame.

Figure 14:
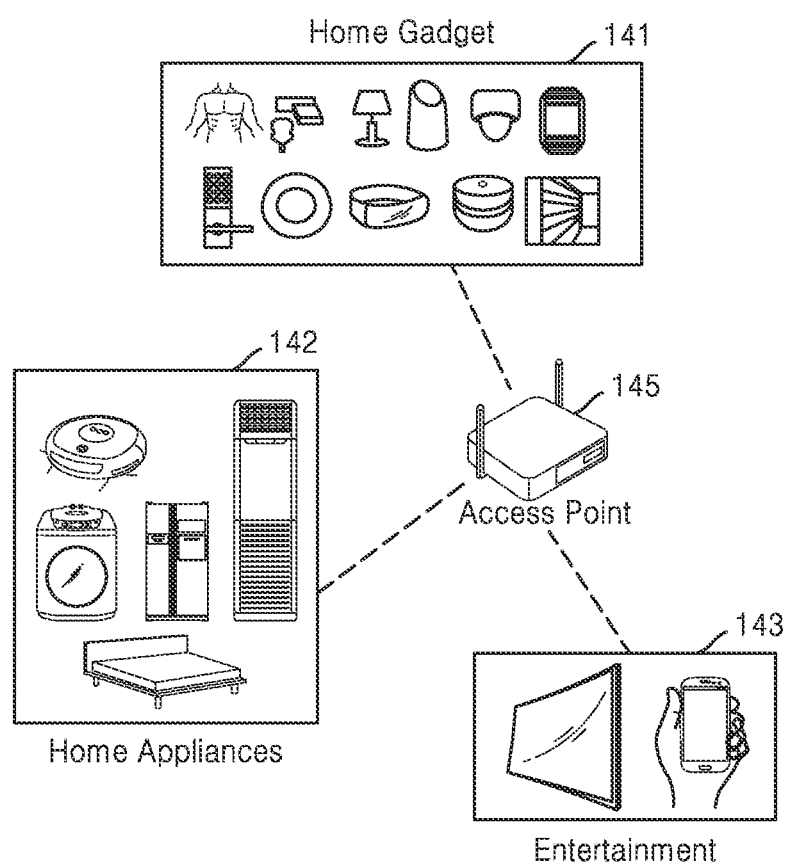
FIG. 14 is a diagram illustrating examples of an apparatus for wireless communication according to an example embodiment.

FIG. 14 is a diagram illustrating examples of an apparatus for wireless communication according to an example embodiment. In detail, FIG. 14 illustrates an internet of things (IoT) network system including home gadgets 141, home appliances 142, entertainment devices 143, and an access point 145 by way of example.

In some example embodiments, in the apparatus for wireless communication of FIG. 14, communication based on the NDPA frame described above with reference to FIGS. 1-13, e.g., channel sounding, may be performed. The access point 145 may sequentially provide the NDPA frame and the NDP to the home gadgets 141, the home appliances 142, and/or the entertainment devices 143. In addition, the home gadgets 141, the home appliances 142, and/or the entertainment devices 143 may provide feedback information for a channel to the access point 145 based on the NDPA frame and the NDP sequentially received from the access point 145. Accordingly, the overhead for channel feedback with the home gadgets 141, the home appliances 142, and/or the entertainment devices 143 based on various protocol standards may be reduced, and as a result, the efficiency of the IoT network system may be increased.

While various example embodiments have been particularly shown and described with reference to the drawings, it will be understood that various changes in form and details may be made therein without departing from the spirit and scope of the following claims.

What is claimed is:

1. A method comprising:
generating a first aggregated physical layer protocol data unit (PPDU) including a first null data packet (NDP) based on an extremely high throughput (EHT) protocol standard and a second NDP based on an EHT+protocol standard, which is a next generation of the EHT protocol standard; and
transmitting the first aggregated PPDU to at least one second apparatus in a wireless local area network (WLAN) system,
wherein each of the first NDP and the second NDP has a same duration, and the first NDP is transmitted in a first band and the second NDP is transmitted in a second band that is different from the first band.

2. The method of claim 1, wherein a total number of bits of the first NDP is equal to a total number of bits of the second NDP.

3. The method of claim 1, further comprising:
generating a null data packet announcement (NDPA) frame; and
transmitting a PPDU including the NDPA frame to the at least one second apparatus.

4. The method of claim 3, wherein the NDPA frame includes a first field having a value commonly representing the EHT protocol standard and the EHT+protocol standard; and a second field including information about the EHT+ protocol standard.

5. The method of claim 4, wherein the second field includes an association identifier (AID) subfield having a specific value indicating that the AID subfield corresponds to the second field, an NDPA version subfield including at least one of release information and standard amendment information of the EHT+protocol standard, and reserved subfields for the EHT+protocol standard.

6. The method of claim 5, wherein the AID subfield consists of 11 bits,
the NDPA version subfield consists of 3 bits, and
the reserved subfields consist of 18 bits.

7. The method of claim 4, wherein the NDPA frame further includes a plurality of EHT station (STA) information fields based on the EHT protocol standard and a plurality of EHT+STA information fields based on the EHT+protocol standard, and
the second field is arranged in the NDPA frame before the plurality of EHT STA information fields and the plurality of EHT+STA information fields.

8. The method of claim 4, wherein the NDPA frame further includes a plurality of EHT station (STA) information fields including information used for first users conforming to the EHT protocol standard and a plurality of EHT+STA information fields including information used for second users conforming to the EHT+protocol standard, and
the second field is arranged in the NDPA frame between the plurality of EHT STA information fields and the plurality of EHT+STA information fields.

9. The method of claim 1, further comprising:
based on the at least one second apparatus comprising a plurality of second apparatuses, transmitting an EHT/EHT+trigger frame to the plurality of second apparatuses.

10. The method of claim 9, wherein the EHT/EHT+ trigger frame includes a common information field including information commonly used for first users conforming to the EHT protocol standard and second users conforming to the EHT+protocol standard, an EHT special station (STA) information field including information commonly used for the first users, and an EHT+special STA information field including information commonly used for the second users.

11. The method of claim 1, wherein the at least one second apparatus includes a third apparatus configured to generate a first feedback frame in response to the first NDP and a fourth apparatus configured to generate a second feedback frame in response to the second NDP,
the method further comprises receiving a second aggregated PPDU including the first feedback frame and the second feedback frame,
the first feedback frame is received through the first band, and
the second feedback frame is received through the second band.

12. A first apparatus comprising:
a transceiver; and
processing circuitry configured to generate a first aggregated physical layer protocol data unit (PPDU) including a first null data packet (NDP) based on thean extremely high throughput (EHT) protocol standard and a second NDP based on an EHT+protocol standard, which is a next generation of the EHT protocol standard, and configured to transmit the first aggregated PPDU to at least one second apparatus in a wireless local area network (WLAN system) via the transceiver, wherein each of the first NDP and the second NDP has a same duration, and the first NDP is transmitted in a first band and the second NDP is transmitted in a second band that is different from the first band.

13. The first apparatus of claim 12, wherein the first NDP includes an EHT-SIG field corresponding to one symbol, and the second NDP includes an (EHT+)-SIG field corresponding to one symbol.

14. The first apparatus of claim 12, wherein the processing circuitry is configured to transmit a PPDU including a null data packet announcement (NDPA) frame to the at least one second apparatus through the transceiver, the NDPA frame including a first field having a value commonly representing the EHT protocol standard and the EHT+protocol standard and a second field including information about the EHT+ protocol standard.

15. The first apparatus of claim 14, wherein the second field includes an association identifier (AID) subfield having a specific value indicating that the AID subfield corresponds to the second field, an NDPA version subfield including at least one of release information and standard amendment information of the EHT+protocol standard, and reserved subfields for the EHT+protocol standard.

16. The first apparatus of claim 12, based on the at least one second apparatus comprises a plurality of second apparatuses, the first apparatus is configured to transmit a PPDU including an EHT/EHT+trigger frame to the plurality of second apparatuses via the transceiver, wherein the EHT/EHT+trigger frame includes a common information field including information commonly used for first users conforming to the EHT protocol standard and second users conforming to the EHT+protocol standard, an EHT special station (STA) information field including information commonly used for the first users, and an EHT+special STA information field including information commonly used for the second users.

17. The first apparatus of claim 12, wherein the at least one second apparatus includes a third apparatus configured to generate a first feedback frame in response to the first NDP and a fourth apparatus configured to generate a second feedback frame in response to the second NDP, the processing circuitry is configured to receive a second aggregated PPDU including the first feedback frame and the second feedback frame via the transceiver, the first feedback frame is received through the first band, the second feedback frame is received through the second band.

18. A second apparatus comprising:

a transceiver; and processing circuitry configured to receive a first aggregated physical layer protocol data unit (PPDU) from a first apparatus in a wireless local area network (WLAN) system through the transceiver, and to estimate a channel with the first apparatus based on a second null data packet (NDP), wherein the first aggregated PPDU includes a first NDP based on an extremely high throughput (EHT) protocol standard and the second NDP based on an EHT+protocol standard that is a next generation of the EHT protocol standard, wherein each of the first NDP and the second NDP has a same duration, and the first NDP is transmitted in a first band and the second NDP is transmitted in a second band that is different from the first band.

19. The second apparatus of claim 18, wherein a number of fields included in the first NDP is the same as a number of fields included in the second NDP.

20. The second apparatus of claim 18, wherein the processing circuitry is configured to generate a feedback frame including information about the estimated channel, and to transmit a PPDU including the feedback frame to the first apparatus through the second band.

* * * * *